United States Patent [19]

Obara et al.

[11] Patent Number: 4,581,513

[45] Date of Patent: Apr. 8, 1986

[54] WIRE-CUT ELECTRIC DISCHARGE MACHINING APPARATUS

[75] Inventors: Haruki Obara, Sagamihara; Yuji Okuyama, Tama, both of Japan

[73] Assignee: Fanuc Ltd., Minamitsuru, Japan

[21] Appl. No.: 717,247

[22] PCT Filed: Jul. 20, 1984

[86] PCT No.: PCT/JP84/00371

§ 371 Date: Mar. 19, 1985

§ 102(e) Date: Mar. 19, 1985

[87] PCT Pub. No.: WO85/00543

PCT Pub. Date: Feb. 14, 1985

[30] Foreign Application Priority Data

Jul. 21, 1983 [JP] Japan ................. 58-133123

[51] Int. Cl.⁴ ................ B23H 1/10; B23H 7/36
[52] U.S. Cl. ............... 219/69 W; 204/129.6; 204/206; 219/69 D
[58] Field of Search .......... 219/69 W, 69 D; 204/129.6, 129.7, 206

[56] References Cited

U.S. PATENT DOCUMENTS

| 4,292,491 | 9/1981 | Tanaka et al. | 219/69 W |
|---|---|---|---|
| 4,363,948 | 12/1982 | Itoh | 219/69 W |
| 4,383,159 | 5/1983 | Inoue | 219/69 W |
| 4,414,456 | 11/1983 | Inoue | 204/129.6 |
| 4,458,130 | 7/1984 | Inoue | 219/69 D |
| 4,479,045 | 10/1984 | Inoue | 219/69 D |
| 4,481,095 | 11/1984 | Inoue | 219/69 W |
| 4,510,366 | 4/1985 | Inoue | 219/69 W |
| 4,521,661 | 6/1985 | Inoue | 219/69 W |

FOREIGN PATENT DOCUMENTS

| 55-31512 | 3/1980 | Japan | 219/69 W |
|---|---|---|---|
| 112729 | 8/1980 | Japan | 219/69 E |

Primary Examiner—C. L. Albritton
Assistant Examiner—Geoffrey S. Evans
Attorney, Agent, or Firm—Staas & Halsey

[57] ABSTRACT

A wire-cut electric discharge machining apparatus for cutting a workpiece by producing an electric discharge across the workpiece and a wire while a machining liquid is allowed to flow between the wire and the workpiece via machining liquid flow rate control apparatus. When machining speed is reduced and machining discharge energy diminishes at a corner-cut portion or at a portion which is to be cut into the shape of a circular arc, the machining liquid flow rate, namely the pressure of the liquid, is reduced to prevent wire oscillation.

8 Claims, 6 Drawing Figures

WIRE-CUT ELECTRIC DISCHARGE MACHINING APPARATUS

FIELD OF THE INVENTION

This invention relates to an electric discharge machining apparatus and, more particularly, to a wire-cut electric discharge machining apparatus for cutting a workpiece into a two-dimensional contour by producing an electric discharge across the workpiece and a longitudinally travelling wire while a machining liquid is allowed to flow between the wire and the workpiece.

BACKGROUND OF THE INVENTION

Electric discharge machining makes it possible to cut a workpiece made of a hard metal, or the like, into any shape by means of a soft metal electrode made of copper, brass, or the like. In particular, electric discharge machines that have come into ever wider use in recent years are adapted to achieve highly precise machining control by way of computerized numerical control, or CNC, based on the processing of software through use of a minicomputer or microcomputer. Among these machines, a wire-cut electric discharge machine is capable of performing highly precise cutting irrespective of workpiece material and hardness and exhibits greater effectiveness the more complicated the shape into which the workpiece is to be cut.

Furthermore, since water can be used as the machining liquid, an additional advantage is that the machine can operate at night without fear of fire. The demand for such wire-cut electric discharge machines is growing.

FIG. 1 is a view showing the construction of a conventional wire-cut electric discharge machining apparatus. The conventional wire-cut electric discharge machining apparatus will be described on the basis of FIG. 1.

The wire-cut electric discharge machining apparatus is basically composed of a machine unit A, a machining power supply unit B, and a control unit C. The machine unit A comprises a table drive, a wire drive and a machining liquid supply unit. The table drive generally is referred to as an XY table on which a workpiece 60 is placed for imparting the workpiece with movement relative to a wire 80, which is an electrode. The wire drive is for feeding the wire 80 in a uniform manner.

More specifically, the wire 80 is fed from a wire supply bobbin 81 and is taken up on a wire take-up roller 82. Since the wire 80 repeatedly undergoes complex vibration, guides 70a, 70b are provided at predetermined positions relative to the workpiece 60 in order to support the wire.

The machining liquid supply section uses water as the machining liquid. Pure liquid contained in a pure liquid tank 100a is supplied by a pump 20 to upper and lower nozzles 50a, 50b respectively via piping 30 and is jetted as machining liquid from the upper and lower nozzles 50a, 50b into the gap between the wire 80 and workpiece 60. The jetted liquid is recovered as contaminated liquid in a contaminated liquid tank 100b, whence the liquid is drawn up by a pump 21, filtered of sludge, or the like, by a filter 22 and returned to the pure liquid tank 100a following an ion exchange for maintaining the machining liquid at a predetermined conductivity.

The machining power supply unit B supplies discharge energy across the wire 80 and workpiece 60. The control unit C is constituted by a numerical control device (CNC) and is adapted to control the various sections of the machine unit A.

In wire-cut electric discharge machining, the higher the liquid pressure of the machining liquid jetted between the wire 80 and the workpiece 60, the higher the flow velocity, the better the discharge of machining chips produced in the small gap between the wire 80 and the workpiece 60, and the higher the electric discharge efficiency in the direction of machining advance. This enables an increase in machining speed.

As an example if the rate at which water is jetted from both the upper and lower nozzles 50a, 50b respectively is increased by 10 l/min, the machining speed will increase. However, the width of the groove cut in the workpiece will increase greatly when the discharge energy temporarily becomes small in magnitude for some reason during the course of machining and machining is performed at low speed; or the machining energy is reduced and machining speed is slowed down for such purposes as, e.g., preventing breakage of the wire at a corner portion or improving dimensional precision. These conditions will now be described with reference to FIGS. 2 and 3.

FIG. 2 is a view showing an ideal machining example which illustrates the width of a groove cut in a workpiece, and FIG. 3 is a view showing a prior-art machining example which illustrates a workpiece in which the width of a cut groove increases at a corner portion. Thus, ideally, machining is performed in such a manner that the width of the cut groove at linear portions remains unchanged even at corners, as shown in FIG. 2. However, when a corner portion is cut by reducing the discharge energy and lowering machining speed without changing the flow rate of the machining liquid, a problem arises wherein the width of the cut groove increases at the corner portion, as depicted in FIG. 3.

More specifically discharge energy is high when machining is performed at a high speed, and there is a tendency for the wire to be strongly constrained to the center of the cut groove by discharge pressure during machining. Consequently, oscillation of the wire caused by the liquid pressure of the machining liquid has little influence. However, when there is a transition to low-speed machining at a corner portion, or the like, and discharge energy is reduced, there is a weakening of the force ascribable to the discharge pressure that constrains the wire to the center of the cut groove, and the wire is thus caused to oscillate by the liquid pressure of the machining liquid. This enlargement of the cut groove width caused by wire oscillation presents a problem in the prior art.

Though it is possible to diminish the influence of machining liquid pressure on the width of the cut groove by such expedients as increasing wire tension, increasing wire hardness or providing the wire guides closer to the workpiece, there is a practical limit to the amount of wire tension, wire diameter and wire strength in an actual machining operation and it is difficult to bring the wire guides close to the workpiece surface, especially if the workpiece is small in size.

SUMMARY OF THE INVENTION

The present invention has been devised to solve the aforementioned problem encountered in the prior art and the object thereof is to provide a wire-cut electric discharge machining apparatus capable of suppressing a change in the width of a groove cut in a workpiece and of performing highly precise machining even in a case where machining speed is reduced and discharge energy decreased.

To attain the foregoing object, the present invention generally provides a wire-cut electric discharge machining apparatus for wire-cut electric discharge machining for cutting a workpiece by producing an electric discharge across the workpiece and a wire while a machining liquid is allowed to flow between the wire and the workpiece, comprising: control means for controlling electric discharge energy supplied between the wire and the workpiece; machining liquid supply means having flow rate control means for controlling flow rate of the machining liquid supplied between the wire and the workpiece, and control means for reducing the flow rate by controlling the flow rate control means dependent upon a decrease in the amount of electric discharge energy at a corner-cut portion or a portion cut into the shape of a circular arc.

More specifically, according to the present invention, in a case where machining discharge energy is reduced and there is a transition from high-speed machining to low-speed machining at a cutting region where a corner portion or a portion having the shape of a circular arc is cut into a workpiece, the flow rate of the machining liquid is controlled in dependent upon the machining discharge energy to reduce the liquid pressure of the machining liquid supplied between the wire and the workpiece. An increase in the width of the groove cut into the workpiece can thus be suppressed even at the above-described cutting region, and highly precise cutting can be performed. Further, in a case where machining speed is slowed down and machining discharge energy reduced, cooling for electrical discharge and the discharge of cutting scraps are advantageously suppressed in comparison with a case where machining is performed at a high speed and with great machining discharge energy. Accordingly, reducing the flow rate of the machining liquid dependent upon the machining discharge energy as in the present invention is a very rational approach, and such reduction can be adapted to the machining conditions irrespective of the wire path. A wire-cut electric discharge machining apparatus of great reliability can therefore be obtained.

BRIEF DESCRIPTION OF THE DRAWINGS

FIG. 5($b$) is a graphic view illustrating the change in pulse duty according to the embodiment shown in FIG. 5($a$).

DETAILED DESCRIPTION OF THE PREFERRED EMBODIMENTS

Figure 1:
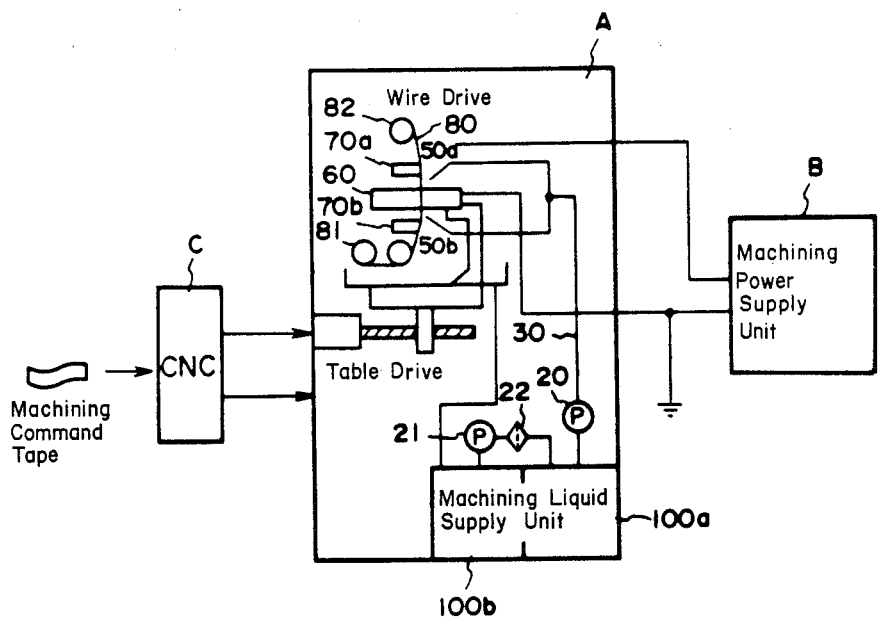
FIG. 1 is a schematic view of a conventional wire-cut electric discharge machining apparatus.
Figure 2:
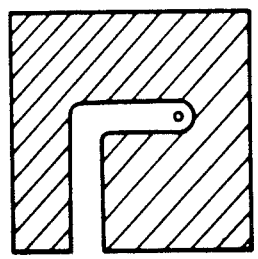
FIG. 2 is a view showing an ideal machining example of the width of a groove cut into a workpiece.
Figure 3:
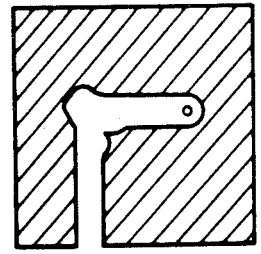
FIG. 3 is a view showing a machining example of the width of a groove cut into a workpiece according to the prior art.
Figure 4:
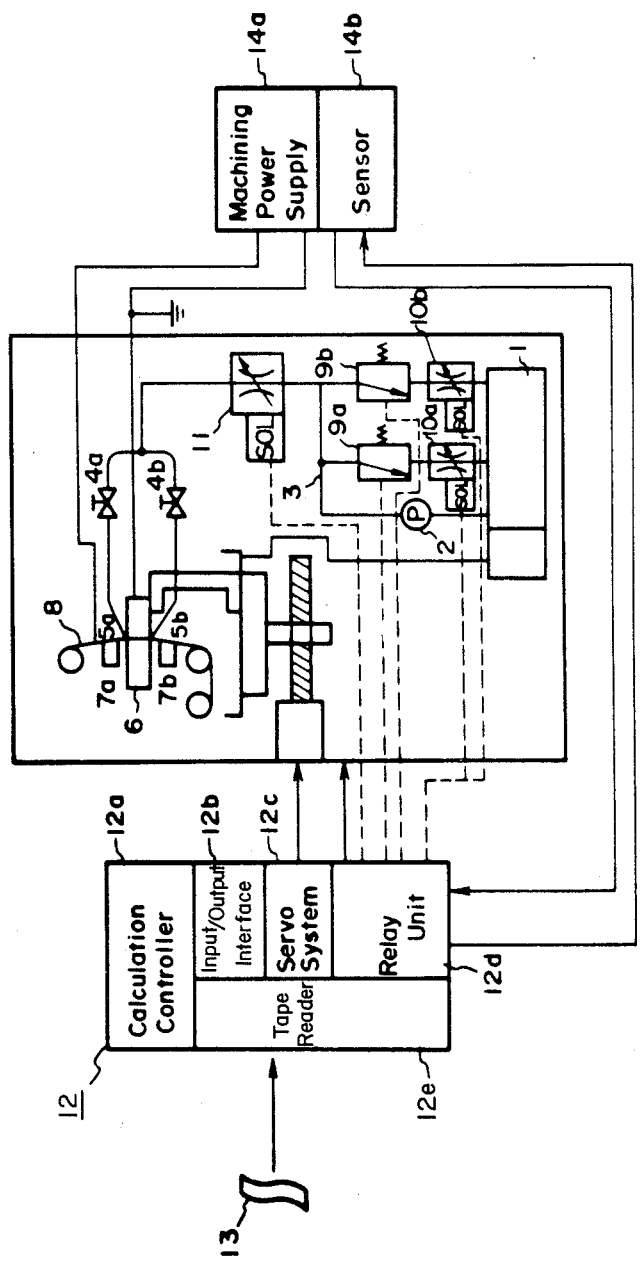
FIG. 4 is a schematic view showing the construction of a wire-cut electric discharge machining apparatus according to the present invention.
Figure 5:
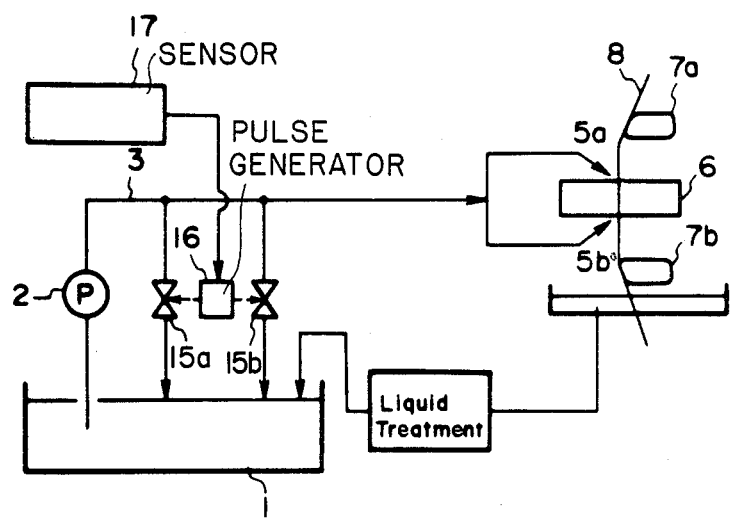
FIG. 5($a$) is a view illustrating an embodiment for carrying out flow rate control of a machining liquid.
Figure 5:
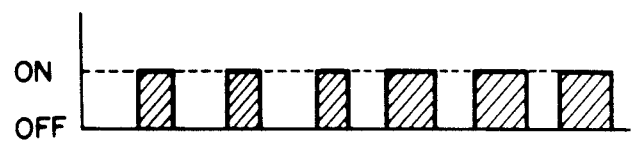

Reference will now be made to FIG. 4, FIG. 5($a$) and FIG. 5($b$) to describe the present invention in greater detail.

FIG. 4 is a view illustrating an embodiment of a wire-cut electric discharge machining apparatus according to the present invention. In the FIG., numeral 1 denotes a tank accommodating a machining liquid, and 2 a pump for drawing up the machining liquid contained in the tank 1 and for supplying the machining liquid to the gap between the workpiece 6 and the wire 8, which consists of copper or brass, via piping 3. The arrangement is such that movement of the wire 8 is guided by wire guides 7$a$, 7$b$. Numerals 4$a$, 4$b$ denote commonly used flow rate regulating cocks arranged in the aforementioned piping 3. Designated at 5$a$, 5$b$ are upper and lower nozzles, respectively, disposed at ends of the piping 3 for jetting the machining liquid, fed under pressure by the pump 2, into the gap between the wire 8, described below, and the workpiece 6. The machining liquid jetted from the upper and lower nozzles 5$a$, 5$b$ maintains insulation and performs cooling for the electric discharge and also facilitates the discharge of machining scraps produced in the small gap between the wire and the workpiece.

Numerals 9$a$, 9$b$ denote relief valves comprising electromagnetic valves, or the like, which are connected to the piping 3. Numerals 10$a$, 10$b$ designate relief rate regulating valves connected in series with the relief valves 9$a$, 9$b$, respectively. The relief valves 9$a$, 9$b$ and relief rate regulating valves 10$a$, 10$b$ cooperate to divert the machining liquid fed under pressure by the pump 2, thereby to controlling the flow rate of the machining liquid to reduce the pressure of the liquid jetted from the nozzles 5$a$, 5$b$. If it is necessary to control the machining liquid in multiple stages in order to effect fine control of the flow rate, the number of relief valves need not be limited to the two, shown in FIG. 4; instead, a multiplicity of relief valves is desirable. Numeral 11 denotes a flow rate control valve disposed in the piping 3. Instead of using the relief valves 9$a$, 9$b$, the apparatus can be arranged so that the flow rate of the machining liquid is controlled by the flow rate control valve 11. Numeral 12 denotes a control unit comprising a numerical control device (CNC) which is composed of: a calculation controller 12$a$; input/output interface 12$b$; servo system 12$c$; relay unit 12$d$; and tape reader 12$e$ for controlling flow rate control means such as the relief valves 9$a$, 9$b$, the relief rate regulating valves 10$a$, 10$b$ and the flow rate control valve 11.

Numeral 13 denotes a machining command tape bearing commands for machining a workpiece, the commands being read by the tape reader 12$e$ so that the machining may be executed. Numeral 14$a$ designates a machining power supply unit having means for controlling discharge energy. The machining power supply unit 14 supplies the gap between the wire 8 and the workpiece 6 with discharge energy commensurate with the machining conditions. Numeral 14$b$ denotes a machining power supply sensor connected to the relay unit 12$d$.

The operation of the wire-cut electric discharge machining apparatus according to the present invention having the construction shown in FIG. 4 will now be described.

In a case where the workpiece is to be cut into a linear portion, the machining liquid is fed under pressure from the tank 1 by the pump 2 and is jetted from the upper nozzle 5$a$ and lower nozzle 5$b$ via the piping 3. As an example, the rate at which the machining liquid is jetted from the upper and lower nozzles 5$a$, 5$b$ is increased to 10 l/min to carry out machining at a higher machining speed. In such case, the flow rate control means, such as the relief valves 9a, 9b, relief rate regulating valves 10a, 10b or flow rate control valve 11 arranged in the piping 3, do not operate. In other words, no particular control of machining liquid flow rate is performed.

However, in a case where, e.g., a corner portion or a portion having the shape of a circular arc is to be cut into the workpiece 6, it is necessary to perform machining at low speed while reducing the machining discharge energy at these regions. In such case, an increase in the width of the groove cut in the workpiece is prevented by reducing the flow rate of the machining liquid and lowering the machining liquid pressure to suppress oscillation of the wire 8.

To reduce the flow rate of the machining liquid, the machining liquid which flows through the piping 3 is allowed to escape via the relief valves 9a, 9b to reduce the pressure of the liquid jetted from the upper and lower nozzles 5a, 5b. The amount of machining liquid emitted from the relief valves 9a, 9b is capable of being regulated by the relief rate regulating valves 10a, 10b provided in series with the relief valves 9a, 9b. The relief valves 9a, 9b and relief rate regulating valves 10a, 10b are arranged to be controlled by the relay unit 12d of the control unit 12. It should be noted that the flow rate of the machining liquid can be controlled by the illustrated flow rate control valve 11 without relying upon the relief valves 9a, 9b. Whichever of the machining liquid flow rate control means is to be selected may be decided at will.

We will now describe with what the machining liquid flow rate is correlated when controlled.

First, the flow rate can be correlated with a set value of a previously programmed machining condition. For example, the machining liquid pressure can be preset by an NC command in such a manner that the flow rate of the machining liquid is controlled at a corner cut portion of a workpiece or at a portion which is to be cut into the shape of a circular arc or the like.

Second, the flow rate can be made to depend upon a mean machining current supplied by the machining power supply unit 14a. Specifically, the mean machining current is sensed by the sensor 14b, which delivers a control signal to the relay unit 12d when the sensed value drops below a set value. Upon receiving the control signal, the relay unit 12d controls either of the relief valves 9a, 9b and relief rate regulating valves 10a, 10b or the flow rate control valve 11, thereby reducing the machining liquid flow rate.

Third, the flow rate can be made to depend upon the machining speed. That is, the servo system 12c is provided with a machining speed sensor for sensing a change in the machining speed, the sensor producing a control signal when the machining speed drops below a set value. The relief valves 9a, 9b and the relief rate regulating valves 10a, 10b, or the flow rate control valve 11, are controlled via the relay unit 12d to reduce the machining liquid flow rate.

When the corner cutting portion of the workpiece or the portion cut to the shape of a circular arc is passed and there is a transition to a linear portion, the foregoing components are controlled via the relay unit 12d in such a manner that the machining liquid flow rate returns to its previous state.

In addition to machining discharge energy and machining liquid pressure, other factors that influence machining characteristics in wire-cut electric discharge machining are the distance between the wire guide 7a and the wire guide 7b, the wire material, diameter and tension, the thickness of the workpiece, and the like. Using these values as parameters, it is possible to carry out highly precise machining by selecting the number of relief valves to be opened and regulating the opening degree of the relief rate regulating valves or of the flow rate control valve.

FIGS. 5(a) and (b) are views showing another embodiment for controlling the flow rate of the machining liquid. It should be noted that components similar to those shown in FIG. 4 are designated by like reference characters and these portions are not described again.

When the wire 8 reaches a corner cut portion of the workpiece 6 or a portion of the workpiece which is to be cut into the shape of a circular arc or the like, this is sensed by a sensor 17, which responds by applying an output signal to a pulse generator 16 for throttle valve drive. The pulse generator 16 generates pulses, the pulse duty whereof varies as shown in FIG. 5(b) based on a change in the output signal of the sensor 17. For example, the sensor 17 senses mean current for machining. The arrangement is such that the pulse width is reduced if the current is large in magnitude and increased if the mean current diminishes. The pulse duty is thus changed by an increase or decrease in mean current. Throttle valves 15a, 15b ordinarily are closed. The throttle valves 15a, 15b are closed for a duration corresponding to a value obtained by integrating the aforesaid pulses.

Thus, by way of example, when the mean current becomes small in magnitude, the throttle valves are opened wider than would be the case for a large mean current, thereby increasing the amount of diverted machining liquid. As a result, there is a decline in the pressure of the machining liquid jetted from the nozzles 5a, 5b, so that oscillation of the wire 8 can be reduced. If the opening degree of the throttle valves is controlled by the change in pulse duty, then the throttle valves alone will suffice and there will be no need to provide the complicated valve means such as the serially disposed relief valves and relief rate regulating valves of the earlier embodiment.

In still another embodiment of the present invention, the pulse generator 16 and throttle valves 15a, 15b in FIG. 5(a) are removed to eliminate the branching paths of the machining liquid, and a speed control unit for controlling the rpm of the motor that drives the pump 2 is provided. When the sensor 17 senses that the wire 8 has arrived at the corner cut portion of the workpiece 6 or the portion of the workpiece to be cut into the shape of a circular arc, the speed control unit responds to a signal from the sensor 17 by reducing the rpm of the motor for the pump 2 to diminish the amount of machining liquid supplied from the pump 2 to the nozzles 5a, 5b, thereby enabling oscillation of the wire 8 to be suppressed. With this embodiment, the structure can be simplified over that of the second embodiment.

The present invention is applicable not only to a wire-cut electric discharge machine but also to control of a machining liquid in a die milling electric discharge machine.

We claim:

1. A wire-cut electric discharge machining apparatus for cutting an electrically conductive workpiece by producing an electric discharge across the workpiece and a wire while a machining liquid is allowed to flow between the wire and the workpiece, comprising:

(a) first control means for controlling electric discharge energy supplied between the wire and the workpiece;

(b) machining liquid supply means having second control means for controlling flow rate of the machining liquid supplied between the wire and the workpiece; and (c) third control means for controlling said second control means to decrease the flow rate of the machining liquid dependent upon a decrease in an amount of electric discharge energy at one of the group of a corner-cut portion and a portion cut into the shape of a circular arc.

2. A wire-cut electric discharge machining apparatus according to claim 1, wherein said third control means comprises machining condition setting means for programming machining conditions in advance, and wherein said third control means controls said second control means on the basis of a value set by said machining condition setting means.

3. A wire-cut electric discharge machining apparatus according to claim 1, wherein said third control means comprises measurement means for measuring machining speed, and wherein said third control means controls said second control means on the basis of a value measured by said measurement means.

4. A wire-cut electric discharge machining apparatus according to claim 1, further comprising electric discharge energy measurement means for measuring said electric discharge energy, wherein said third control means controls said second control means on the basis of a value measured by said electric discharge measurement means.

5. A wire-cut electric discharge machining apparatus according to claim 1, wherein said third control means comprises means for changing a pulse duty dependent upon an amount of electric discharge machining, and wherein said third control means controls said second control means based on a change in pulse duty effect by said means for changing a pulse duty.

6. A wire-cut electric discharge machining apparatus according to claim 1, wherein said second control means comprises relief valves for diversion connected to piping for the machining liquid.

7. A wire-cut electric discharge machining apparatus according to claim 6, wherein said second control means comprises relief rate regulating valves connected in series with said relief valves.

8. A wire-cut electric discharge machining apparatus according to claim 1, wherein said second control means comprises a flow rate control valve arranged in piping for the machining liquid.

* * * * *